US006438696B1

(12) United States Patent
Baran et al.

(10) Patent No.: US 6,438,696 B1
(45) Date of Patent: Aug. 20, 2002

(54) SECURITY MONITORING ARRANGEMENT FOR A COMPUTER SYSTEM

(75) Inventors: Uri Baran, Camberley; Edwin Turner, Bucks, both of (GB)

(73) Assignee: International Computers Limited, Putney (GB)

( * ) Notice: Subject to any disclaimer, the term of this patent is extended or adjusted under 35 U.S.C. 154(b) by 1259 days.

(21) Appl. No.: 08/543,640

(22) Filed: Oct. 16, 1995

(30) Foreign Application Priority Data

Nov. 15, 1994 (GB) ........................................ 9422959

(51) Int. Cl.[7] ........................ G06F 11/30; G06F 17/60; H04N 9/47; G07G 1/14

(52) U.S. Cl. ....................... 713/202; 348/150; 348/151; 902/22; 902/24

(58) Field of Search ........................... 395/187.01, 216, 395/217, 218, 221; 348/150, 151, 153, 148, 143; 364/918.4, 918.9, 405; 902/22, 24, 1, 8, 20; 713/200, 201, 202

(56) References Cited

U.S. PATENT DOCUMENTS

| | | | | | |
|---|---|---|---|---|---|
| 4,001,881 | A | | 1/1977 | Folsom | 360/5 |
| 4,054,752 | A | | 10/1977 | Dennis | 179/5 R |
| 4,070,564 | A | * | 1/1978 | Tucker | 364/405 |
| 4,145,715 | A | * | 3/1979 | Clever | 358/108 |
| 4,237,483 | A | * | 12/1980 | Clever | 358/108 |
| 4,337,482 | A | | 6/1982 | Coutta | 358/108 |
| 4,630,110 | A | | 12/1986 | Cotton | 358/108 |
| 4,727,243 | A | * | 2/1988 | Savar | 235/379 |
| 4,991,008 | A | * | 2/1991 | Nama | 358/108 |
| 5,216,502 | A | * | 6/1993 | Katz | 358/108 |
| 5,315,510 | A | * | 5/1994 | Kimura et al. | 364/405 |
| 5,491,511 | A | * | 2/1996 | Odle | 348/153 |

FOREIGN PATENT DOCUMENTS

| | | |
|---|---|---|
| EP | 0 221 631 | 5/1987 |
| GB | 2 182 224 | 5/1987 |
| WO | WO 95/21506 | 8/1995 |

OTHER PUBLICATIONS

Sensormatic POS/EM—Point of Sale Exception Monitoring, Sensormatic Electronic Corp. pp. 1–4.*

* cited by examiner

*Primary Examiner*—Norman M. Wright
(74) *Attorney, Agent, or Firm*—Lee, Mann, Smith, McWilliams, Sweeney & Ohlson

(57) ABSTRACT

An electronic point-of-sale (PoS) system comprises a network with a number of PoS terminals and a PoS server computer attached to it. The PoS terminals and the PoS server interact over the network to perform conventional PoS transactions. Additionally, each of the PoS terminals monitors its own operation for predetermined security-related events (such as refunds or voids). Upon detection of such an event, the PoS terminal sends an alert message and data over the network to a control computer (which may be the PoS server computer, or may be a separate computer). The control computer responds to the alert message by activating a video camera and recorder to record a view of the PoS terminal, along with the data.

7 Claims, 3 Drawing Sheets

SECURITY MONITORING ARRANGEMENT FOR A COMPUTER SYSTEM

BACKGROUND TO THE INVENTION

This invention relates to an arrangement for monitoring the operation of a computer system to detect and record security-related events, i.e. incidents that might compromise the security of the system. The invention is particularly, although not exclusively, concerned with security monitoring arrangements for retail systems. By a retail system is meant a system comprising a number of point-of-sale (PoS) terminals, connected to a central computer, for processing transactions in a retail environment.

All retailers suffer losses through fraud or theft. Surveys have revealed that a large proportion of such loss to retailers is attributable to staff activity. This includes collusion at point of sale, for example by passing goods through the checkout without charging them.

One known scheme for countering such losses is to intercept the data sent to the till audit roll printer in each PoS terminal, and to route this data via an intelligent network of concentrating equipment to a central security computer. The security computer monitors the audit roll data received by it, looking for security related events, i.e. events which indicate some potentially suspicious action on the part of the terminal operator, such as for example refunds. When such an event is detected by the security computer, it activates a closed-circuit television (CCTV) camera and video cassette recorder (VCR), to automatically start recording the actions of the terminal operator. At the same time, the till audit roll data is recorded, superimposed on the picture.

However, a problem with this previously proposed scheme is that it is not well integrated with the retail system, and hence is expensive. The object of the invention is to overcome these problems.

SUMMARY OF THE INVENTION

According to the invention there is provided a computer system comprising:

(a) a data transmission network;

(b) a plurality of operator terminals connected to the network;

(c) a control computer connected to the network; and (d) at least one closed circuit television camera and video recorder connected to said control computer;

(e) wherein each of said terminals includes means for monitoring its own operation for predetermined security-related events and, upon detection of such an event, for sending an alert message and event data over the network to said control computer;

(f) and wherein said control computer includes means for responding to said alert message by activating said camera and recorder to record a view of the operator terminal, along with said event data.

DESCRIPTION OF AN EMBODIMENT OF THE INVENTION

Figure 1:
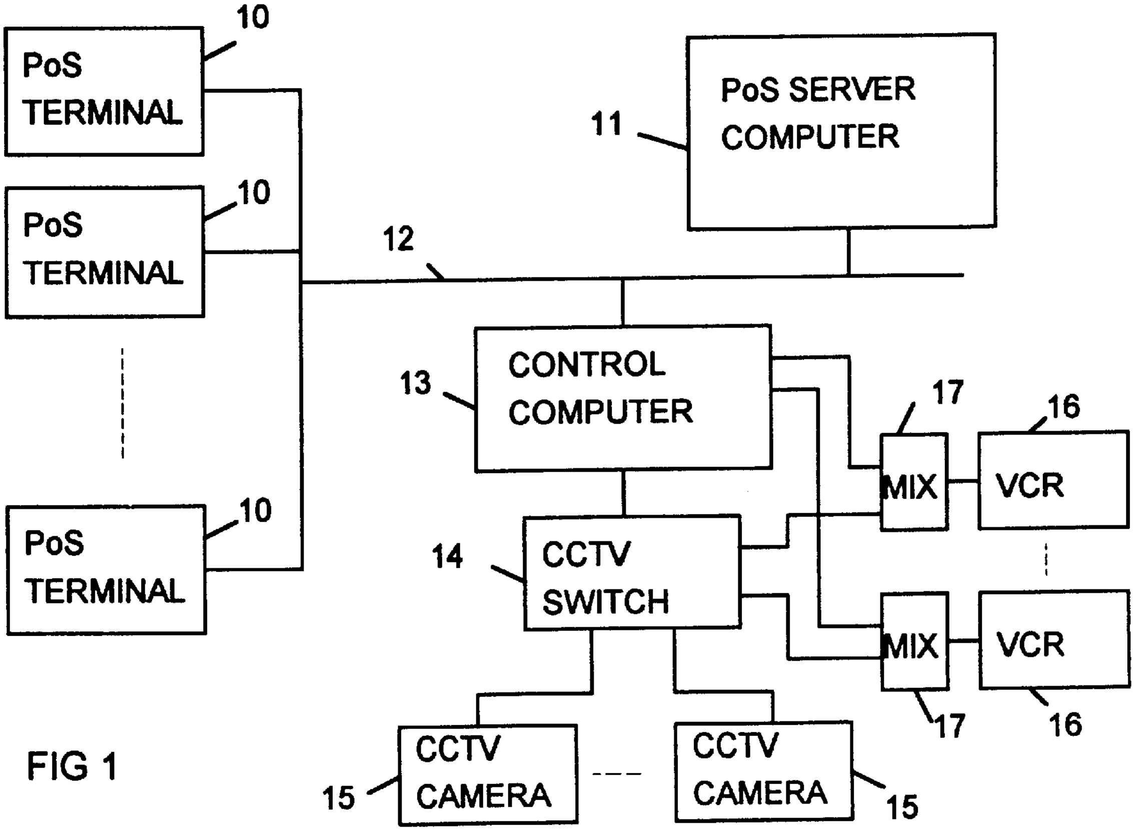
FIG. 1 is a block diagram of a retail system including a number of PoS terminals and a security control computer.

One embodiment of the invention will now be described by way of example with reference to the accompanying drawings. Referring to FIG. 1, this shows a computer system for a retail store. The system comprises a number of PoS terminals 10, connected to a PoS server computer 11 by way of an in-store LAN 12. The PoS server 11 may be a standard 486-based personal computer (PC), and performs a number of functions, such as maintaining a database of goods, prices and inventory levels, maintaining a log of transactions, and printing reports. The LAN 12 may be an Ethernet, or other standard LAN.

The system also includes a control computer 13, which may be a conventional PC, connected to the in-store LAN. The control computer 13 controls a CCTV switch 14, which interconnects a number of CCTV cameras 15 with a number of VCRs 16, by way of mixer units 17. The mixer units 17 allow data from the control computer to be mixed with the video data, so that the data from the control computer is superimposed on the recorded video data. (Alternatively, the function of the mixer units may be performed inside the control computer itself).

The control computer can independently control each camera for pan, tilt and zoom, so that it can be directed at any of a number of different terminals. (Alternatively, in other embodiments of the invention, fixed cameras may be used, with a separate camera pointing at each terminal). The control computer can also independently start or stop each VCR.

Figure 2:
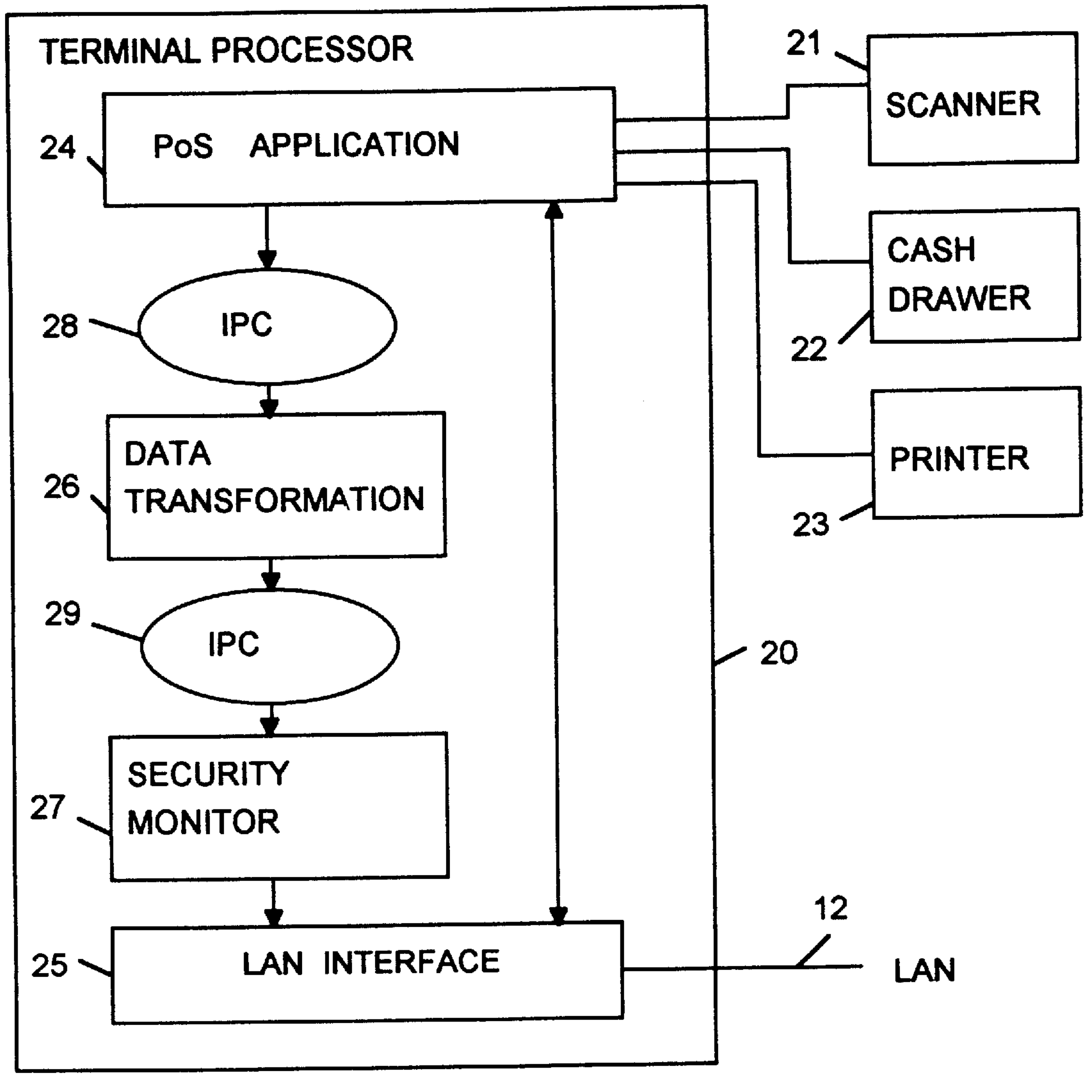
FIG. 2 is a block diagram showing a monitoring mechanism within one of the terminals.

Referring to FIG. 2, this shows one of the PoS terminals in more detail. The terminal comprises a processor 20, which communicates with a number of peripherals, such as for example a bar code scanner 21, a cash drawer 22, and a printer 23.

The terminal processor 20 runs a PoS application program 24, which performs the conventional PoS terminal functions, such as identifying goods, pricing them, and printing out till receipts. The PoS application 24 communicates with the PoS server 11 over the LAN 12, by way of a LAN interface 25.

The terminal processor also includes a data transformation process 26 and a security monitor process 27 which run concurrently with the PoS application 24. The PoS application and transformation process are linked by an inter-process communication 28, and the transformation process and security monitor process are linked by an inter-process communication (IPC) 29.

The transformation process 26 receives data indicating the actions performed by the PoS application and its interactions with the terminal peripherals, and transforms this data into a standard, predefined format, for use by the security monitor process. This transformation enables a generic security monitor process to be used with a number of different PoS application types.

The security monitor process 27 filters the incoming data, looking for predefined security-related events, such as for example refunds or voids. When it detects such an event, the security monitor process sends an alert message over the LAN 12 to the control computer, by way of the LAN interface 25.

Figure 3:
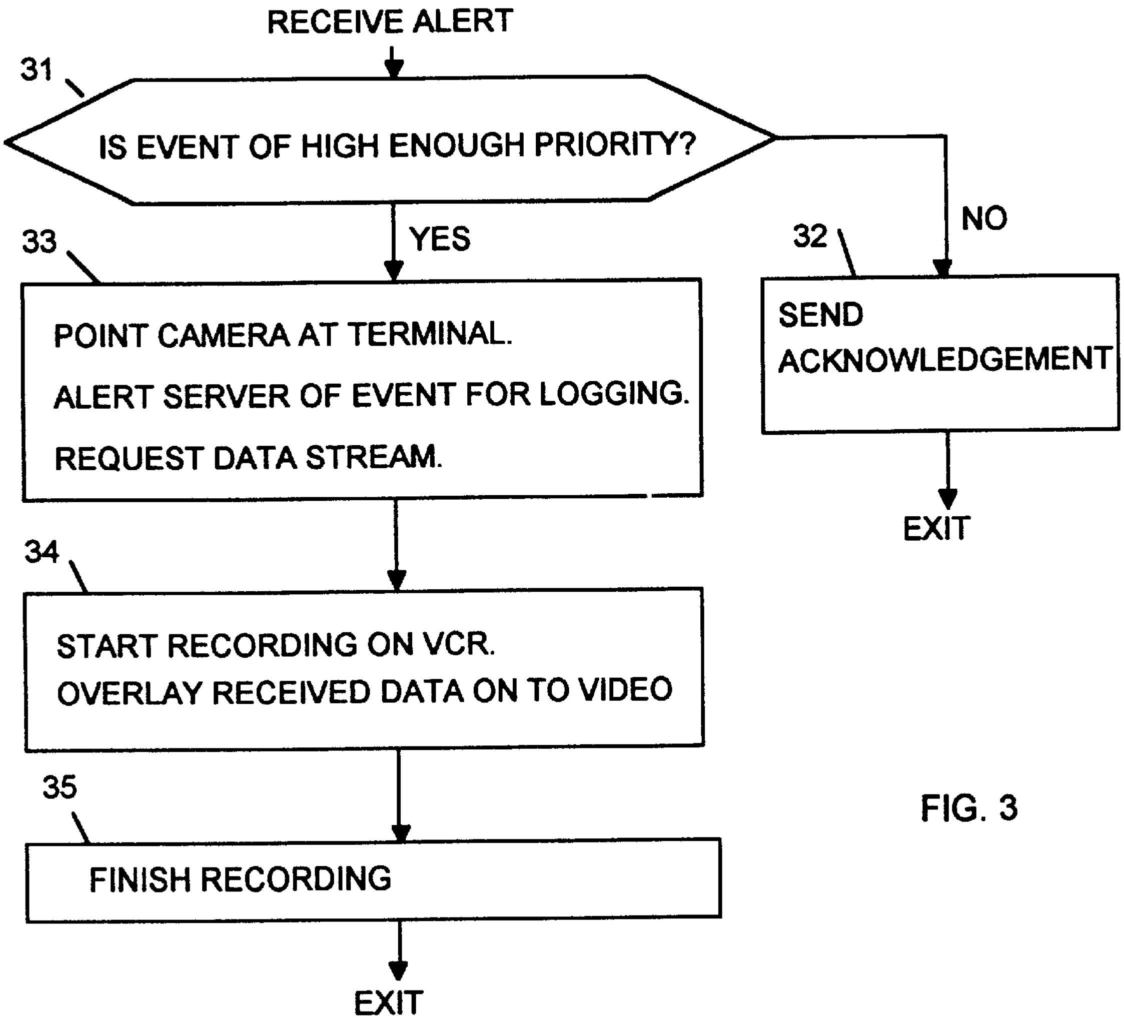
FIG. 3 is a flow chart showing the operation of the security control computer.

Referring to FIG. 3, this shows the operation of the control computer 13 when it receives an alert message from the security monitor process.

(Box 31) The control computer first checks whether the event is of sufficiently high priority to require any action. The priority may depend, for example, on the nature of the event, previous events, and on the number of CCTV cameras currently free.

(Box 32) If the event is not of sufficiently high priority, the control computer simply returns an acknowledgement to the security monitor process, and no further action is taken.

(Box 33) On the other hand, if the event is of sufficiently high priority, the control computer then performs the following actions:

select one of the CCTV cameras 15 and point it at the terminal from which the alert originated.

send a control signal to the CCTV switch 14, causing it to connect the selected camera to a selected one of the VCRs 16.

send an alert message, over the LAN, to the PoS server 11, instructing the PoS server to log the event.

send a response to the security monitor process 27 from which the alert originated, requesting it to start sending data.

When the security monitor process 27 receives this response, it starts sending a data stream derived from its input inter-process communication 29, over the LAN to the control computer. This data stream may, for example, include the data printed on the till audit roll, and any other data that may be of interest.

(Box 34) The control computer then sends a control signal to the selected VCR causing it to start recording the video signals from the selected CCTV camera, with the data from the security monitor process superimposed.

(Box 35) The recording is then finished, and the VCR and camera are returned to waiting mode.

In addition to the security monitoring function described above, the control computer may also perform other control functions, such as controlling security, heating, ventilation, refrigeration and lighting in the store. It can be seen that the system described above removes the need for any special concentrating network, by using the existing network connection between the PoS terminals and PoS server also for providing the connection between the terminals and the control computer. Moreover, the system described above enables monitoring of all relevant data in the terminal, not just that which is sent to the till audit roll.

SOME POSSIBLE MODIFICATIONS

It will be appreciated that many modifications may be made to the system described above without departing from the scope of the invention.

For example, the functionality of FIG. 3 may be performed by the PoS server computer, rather than by a separate control computer; that is, the PoS server computer may act as a control computer as well as performing its own PoS-related functions.

In another possible modification, the PoS server computer may also act as a PoS terminal.

In another possible modification, the functionality of the PoS server may be distributed amongst two or more of the PoS terminals, so that there is no need for a separate PoS server computer.

What is claimed is:

1. A computer system comprising:

(a) a data transmission network;

(b) a plurality of operator terminals connected to the network;

(c) a control computer connected to the network; and (d) at least one closed circuit television camera and video recorder connected to said control computer;

(e) wherein each of said terminals includes (i) means for generating event data, and (ii) monitoring means for filtering said event data to detect predetermined security-related events and, upon detection of such an event, for sending an alert message and said event data over the network to said control computer;

(f) and wherein said control computer includes means for responding to said alert message by activating said camera and recorder to record a view of the operator terminal, along with said event data.

2. A system according to claim 1 wherein said operator terminals are point-of-sale terminals.

3. A system according to claim 1 wherein each of said terminals further includes means for translating data between a first format, specific to the particular terminal, and a second format, specific to said monitoring means.

4. A system according to claim 1 including means for directing said closed circuit television camera at one of said terminals, in response to an alert message from said one of said terminals.

5. An electronic point-of-sale (PoS) system comprising:

(a) a data transmission network;

(b) a plurality of PoS terminals connected to the network;

(c) a PoS server connected to said network, for performing PoS transactions with said PoS terminals over said network;

(d) a control computer connected to the network; and (e) at least one closed circuit television camera and video recorder connected to said control computer;

(f) wherein each of said PoS terminals includes (i) a PoS application for generating event data indicating the actions performed by the PoS application, and (ii) monitoring means for filtering said event data to detect predetermined security-related events and, upon detection of such an event, for sending an alert message and said event data over the network to said control computer;

(g) and wherein said control computer includes means for responding to said alert message by activating said camera and recorder to record a view of the PoS terminal, along with said event data.

6. A system according to claim 5 wherein said PoS server comprises a separate PoS server computer, including means for maintaining a retail database for use by said PoS terminals.

7. A system according to claim 5 wherein each of said PoS terminals further includes means for translating data between a first format, specific to the particular terminal, and a second format, specific to said monitoring means.

* * * * *